(12) United States Patent
Li et al.

(10) Patent No.: US 11,084,885 B2
(45) Date of Patent: Aug. 10, 2021

(54) MANUFACTURE OF NANOCELLULOSE AND INTERMEDIATES THEREOF

(71) Applicant: FineCell Sweden AB, Bromma (SE)

(72) Inventors: Dongfang Li, Bromma (SE); Jonatan Henschen, Stockholm (SE); Monica Ek, Hägersten (SE)

(73) Assignee: FINECELL SWEDEN AB, Bromma (SE)

( * ) Notice: Subject to any disclaimer, the term of this patent is extended or adjusted under 35 U.S.C. 154(b) by 323 days.

(21) Appl. No.: 16/003,176

(22) Filed: Jun. 8, 2018

(65) Prior Publication Data

US 2018/0291119 A1 Oct. 11, 2018

Related U.S. Application Data

(63) Continuation of application No. PCT/SE2016/051280, filed on Dec. 16, 2016.

(30) Foreign Application Priority Data

Dec. 16, 2015 (SE) .................................... 1551657-8

(51) Int. Cl.
*C08B 3/24* (2006.01)
*C08L 1/10* (2006.01)
(Continued)

(52) U.S. Cl.
CPC .................. *C08B 3/24* (2013.01); *C08B 3/00* (2013.01); *C08B 3/06* (2013.01); *C08K 5/11* (2013.01);
(Continued)

(58) Field of Classification Search
CPC ....................................................... C08B 3/06
See application file for complete search history.

(56) References Cited

U.S. PATENT DOCUMENTS

| | | |
|---|---|---|
| 2003/0041985 A1 | 3/2003 | Akhtar et al. |
| 2011/0196094 A1 | 8/2011 | Hamad et al. |
| 2012/0009661 A1 | 1/2012 | Miyawaki et al. |

FOREIGN PATENT DOCUMENTS

| | | |
|---|---|---|
| CN | 102432686 A | 5/2012 |
| CN | 102911274 A | 2/2013 |

(Continued)

OTHER PUBLICATIONS

Gardea-Hernandez, G. et al. "Fast wood fiber esterification. I. Reaction with oxalic acid and cetyl alcohol", In: Carbohydrate Polymers, 2008, vol. 71, pp. 1-8, 001:10.1016/j.carbpol.2007.05.014.

(Continued)

*Primary Examiner* — Jacob T Minskey
(74) *Attorney, Agent, or Firm* — Gabriela B. Tomescu, Esq.; Bergenstråhle & Partners AB

(57) ABSTRACT

The present invention relates to a method for manufacturing nanocellulose comprising the steps of: a) providing a cellulose-containing material wherein the cellulose-containing material contains less than 20 wt. % water, b) contacting the cellulose-containing material with oxalic acid dihydrate, and heating above the melting point of the oxalic acid dihydrate, to obtain cellulose oxalates, c) washing the mixture, d) preparing a suspension comprising the washed material from step c) and e) recovering nanocellulose from the suspension. The present invention relates also to a method of manufacturing nanocellulose intermediate which comprises the above described steps a)-c). The methods disclosed in the present invention are quick, simple, and direct. Pulp can be used as raw material. A considerable amount of free carboxyl groups are introduced. A high yield can be obtained. The methods are inexpensive.

13 Claims, 6 Drawing Sheets

(51) Int. Cl.
  *D21C 9/00* (2006.01)
  *D21H 11/18* (2006.01)
  *C08L 1/12* (2006.01)
  *C08B 3/06* (2006.01)
  *C08K 5/11* (2006.01)
  *C08B 3/00* (2006.01)
  *B29C 48/00* (2019.01)

(52) U.S. Cl.
  CPC ............... *C08L 1/10* (2013.01); *C08L 1/12* (2013.01); *D21C 9/00* (2013.01); *D21H 11/18* (2013.01); *B29C 48/022* (2019.02); *C08L 2205/025* (2013.01)

(56) References Cited

FOREIGN PATENT DOCUMENTS

| CN | 103910805 A | 7/2014 |
|---|---|---|
| CN | 104262687 A | 1/2015 |
| DE | 3234845 C1 | 3/1984 |
| RU | 2556144 C1 | 7/2015 |
| WO | 9915564 A1 | 4/1999 |
| WO | 2007008689 A2 | 1/2007 |

OTHER PUBLICATIONS

Abraham, E. et al. "Extraction of nanocellulose fibrils from lignocellulosic fibres: A novel approach", In: Carbohydrate Polymers, 2011, vol. 86, pp. 1468-1475, 001:10.1 016/j.carbpol.2011.06.034.

Sonia, A. et al. "Celluloses microfibres (CMF) reinforced poly (ethylene-co-vinyl acetate) (EVA) composites: Dynamic mechanical, gamma and thermal ageing studies" In: Chemical Engineering Journal, 2013, vol. 228, pp. 1214-1222, 001:10.1 016/j .cej .2013. 04.091.

Wikipedia, Oxalic Acid, https://en.wikipedia.org/wiki/Oxalic_acid.

Testova Lidia et al, "Cellulose degradation in alkaline media upon acidic pretreatment and stabilisation", Carbohydrate Polymers, Applied Science Publishers, Ltd. Barking, GB, (Feb. 20, 2013), vol. 100, doi:10.1016/J.CARBPOL.2013.01.093, ISSN 0144-8617, pp. 185-194 [1].

Brinchi, L., et al. "Production of nanocrystalline cellulose from lignocellulosic biomass: technology and applications." Carbohydrate polymers 94.1 (2013): 154-169.

Li, Shujun, et al. "Fabrication of nano-crystalline cellulose with phosphoric acid and its full application in a modified polyurethane foam" Polymer degradation and stability 98.9 (2013): 1940-1944.

Beck-Candanedo, Stephanie, Maren Roman, and Derek G. Gray. "Effect of reaction conditions on the properties and behavior of wood cellulose nanocrystal suspensions." Biomacromolecules 6.2 (2005): 1048-1054.

Reaction

Most possible structure

MANUFACTURE OF NANOCELLULOSE AND INTERMEDIATES THEREOF

This application is the continuation of International Application No. PCT/SE2016/051280, filed 16 Dec. 2016, which claims the benefit of Swedish Patent Application No. SE 1551657-8 filed 16 Dec. 2015, the entire contents of which are hereby incorporated by reference.

TECHNICAL FIELD

The present invention relates generally to nanocellulose as well as a method for manufacturing nanocellulose. More specifically, the present invention relates to nanocrystalline cellulose and/or nanofibrillated cellulose as well as methods for manufacturing nanocrystalline cellulose and/or nanofibrillated cellulose. Furthermore, the present invention also relates to nanocellulose intermediates as well as methods for manufacturing a nanocellulose intermediates.

BACKGROUND

Nanocellulose has driven increased attention over the last decade. Hitherto, the reported "main stream" methods for the preparation of nanocellulose are generally categorized into 2 groups:

(1) preparation of nanocrystalline celluloses/cellulose nanocrystals/cellulose nanowhiskers by strong acid hydrolysis and thereafter mechanical disintegration (Rånby B. G. 1949. Aqueous colloidal solutions of cellulose micelles. Acta Chemica Scandinavica 3: 649-650. Dong X. M., Revol J-F. and Gray D. G. 1998. Effect of microcrystallite preparation conditions on the formation of colloid crystals of cellulose. Cellulose 5: 19-32. Beck-Candanedo S., Roman M. and Gray D. G. 2005. Effect of Reaction Conditions on the Properties and Behaviour of Wood Cellulose Nanocrystal Suspensions. Biomacromolecules 6: 1048-1054.), (2) preparation of nanofibrillated celluloses/cellulose nanofibrils by mechanical disintegration of cellulose directly (Turbak A. F., Snyder F. W. and Sandberg K. R. 1983. Microfibrillated cellulose, a new cellulose product: Properties, uses, and commercial potential. Journal of Applied Polymer Science Applied Polymer Symposia 37: 815-827.), or cellulose after enzymatic treatment (Henriksson M., Henriksson G., Berglund L. A. and Lindström T. 2007. An environmentally friendly method for enzyme-assisted preparation of microfibrillated cellulose (MFC) nanofibers. European Polymer Journal 43: 3434-3441.), or cellulose after chemical treatments such as partial carboxymethylation (Wågberg L., Decher G., Norgren M., Lindström T., Ankerfors M. and Axnäs K. 2008. The build-up of polyelectrolyte multilayers of microfibrillated cellulose and cationic polyelectrolytes. Langmuir 24: 784-795.) or 2,2,6,6-tetramethylpiperidine-1-oxy radical (TEMPO) mediated oxidation (Saito T., Kimura S., Nishiyama Y. and Isogai A. 2007. Cellulose nanofibers prepared by TEMPO-mediated oxidation of native cellulose. Biomacromolecules 8: 2485-2491.).

Abraham E., Deepa B., Pothan L. A., Jacob M., Thomas S., Cvelbar U. and Anandjiwala R. 2011. In "*Extraction of nanocrystalline cellulose fibrils from lignocellulosic fibres: A novel approach*". Carbohydrate Polymers 86: 1468-1475 discloses a method of carrying out a mild acid hydrolysis of the agricultural sourced cellulose with 5% oxalic acid solution to prepare nanocrystalline cellulose, followed by harsh mechanical disintegration.

Gardea-Hernández G., Ibarra-Gómez R., Flores-Gallardo S. G., Hernández-Escobar C. A., Pérez-Romo P. and Zaragoza-Contreras E. A. 2008. In "Fast wood fiber esterification. I. Reaction with oxalic acid and cetyl alcohol". Carbohydrate Polymers 71: 1-8 discloses a method for modifying wood fiber with non-solvent media, to produce ready-to-use hydrophobic fiber suitable for use in composites. Oxalic acid is used as an esterification agent for wood fiber.

Sirviö, J. A., Visanko, M. and Liimatainen, H. 2016 (published 1 Aug. 2016). In "Acidic deep eutectic solvents as hydrolytic media for cellulose nanocrystal production". Biomacromolecules 17: 3025-3032 discloses a method of producing cellulose nanocrystals by using eutectic solvents comprising oxalic acid dihydrate and choline chloride.

WO 01/02441 discloses production of microcrystalline cellulose. Pulp is hydrolyzed with active oxygen in an acidic environment. For instance, oxalic acid can be present. The pulp is treated in aqueous environment.

However, a considerable amount of water is normally used in these processes as well as expensive processing reagents such as TEMPO and enzymes. These factors in total make the production of nanocellulose in larger scale a costly process.

It is a problem that the production of nanocrystalline cellulose and nanofibrillated cellulose requires a lot of water and the production yield is low, which make such process expensive.

SUMMARY

It is an object of the present invention to obviate at least some of the disadvantages in the prior art and provide an improved method for manufacturing nanocellulose, i.e. nanocrystalline cellulose and/or nanofibrillated cellulose.

In a first aspect there is provided a method for manufacturing nanocellulose, said method comprising the steps of:
a) providing a cellulose-containing material wherein the cellulose-containing material contains less than 20 wt. % water, preferably less than 10 wt. % water,
b) contacting the cellulose-containing material with oxalic acid dihydrate, and heating above the melting point of the oxalic acid dihydrate, to obtain cellulose oxalates,
c) washing the mixture resulting from step b),
d) preparing a suspension comprising the washed material from step c), and
e) recovering nanocellulose from the suspension,
wherein said nanocellulose is nanocrystalline cellulose.

In a second aspect of the invention there is provided a composition comprising nanocrystalline cellulose manufactured according to the method disclosed in the first aspect of the invention.

In a third aspect of the invention there is provided a use of a composition comprising nanocrystalline cellulose according to the second aspect of the invention in at least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a fourth aspect of the invention there is provided a method for manufacturing nanocellulose, said method comprising the steps of:
a. providing a cellulose-containing material wherein the cellulose-containing material contains less than 20 wt. % water, preferably less than 10 wt. % water,
b. contacting the cellulose-containing material with oxalic acid dihydrate, and heating above the melting point of the oxalic acid dihydrate, to obtain cellulose oxalates, wherein the dry weight ratio between cellulose-containing material and oxalic acid dihydrate is 1:1 to 1:100, preferably 1:1 to 1:50, more preferably 1:1 to 1:10, most preferably 1:2.3 to 1.3.9,
c. washing the mixture resulting from step b),
d. preparing a suspension comprising the washed material from step c), wherein the suspension is prepared using micro-fluidization, and
e. recovering nanocellulose from the suspension, wherein said nanocellulose is nanofibrillated cellulose.

In a fifth aspect of the invention there is provided a composition comprising nanofibrillated cellulose manufactured according to the method disclosed in the fourth aspect of the invention.

In a sixth aspect of the invention there is provided a use of a composition comprising nanofibrillated cellulose according to the fifth aspect of the invention in at least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a seventh aspect there is provided a method for manufacturing nanocellulose intermediate, said method comprising the steps of:
a. providing a cellulose-containing material wherein the cellulose-containing material contains less than 20 wt. % water, preferably less than 10 wt. % water,
b. contacting the cellulose-containing material with oxalic acid dihydrate, and heating above the melting point of the oxalic acid dihydrate, to obtain cellulose oxalates,
c. washing the mixture resulting from step b), wherein said nanocellulose intermediate is a nanocrystalline cellulose intermediate.

In an eight aspect of the invention there is provided a composition comprising nanocrystalline cellulose intermediate manufactured according to the method disclosed in the seventh aspect of the invention.

In a ninth aspect of the invention there is provided a use of a composition comprising nanocrystalline cellulose intermediate according to the eighth aspect of the invention in at least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a tenth aspect there is provided a method for manufacturing nanocellulose intermediate, said method comprising the steps of:
a. providing a cellulose-containing material wherein the cellulose-containing material contains less than 20 wt. % water, preferably less than 10 wt. % water,
b. contacting the cellulose-containing material with oxalic acid dihydrate, and heating above the melting point of the oxalic acid dihydrate, to obtain cellulose oxalates,
c. washing the mixture resulting from step b), wherein said nanocellulose intermediate is a nanofibrillated cellulose intermediate.

In an eleventh aspect of the invention there is provided a composition comprising nanofibrillated cellulose intermediate manufactured according to the method disclosed in the tenth aspect of the invention.

In a twelfth aspect of the invention there is provided a use of a composition comprising nanofibrillated cellulose intermediate according to the eleventh aspect of the invention in at least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

Recovering nanocellulose in step e) in the above disclosed aspects of the invention is done by preparing a suspension of nanocellulose, a mixture containing nanocellulose or a dry material containing nanocellulose. Thus, recovering nanocrystalline cellulose and/or nanofibrillated cellulose in step e) is done by preparing a suspension of nanocrystalline cellulose and/or nanofibrillated cellulose, a mixture containing nanocrystalline cellulose and/or nanofibrillated cellulose, or a dry material containing nanocrystalline cellulose.

Further aspects and embodiments are defined in the appended claims, which are specifically incorporated herein by reference.

One advantage is that the cellulose oxalates were prepared with a quick, simple, direct and solvent-free treatment of pulp.

Another advantage is that a considerable amount of free carboxyl groups were introduced while the macromolecular structure of cellulose was broken down to the nano-level due to hydrolysis.

A further advantage is that carboxyl functionalized nanocrystalline cellulose and/or nanofibrillated cellulose can be manufactured with high yields.

Compared to the conventional ways for the preparation of nanocrystalline cellulose and nanofibrillated cellulose, the present method is simpler with much shorter procedures and more economic in terms of no use of water and expensive chemicals.

Yet another advantage is that it is possible to obtain nanocellulose at high yield with a high concentration of carboxyl groups covalently attached.

BRIEF DESCRIPTION OF THE DRAWINGS

The invention is now described, by way of example, with reference to the accompanying drawings, in which.

DETAILED DESCRIPTION

Figure 1:
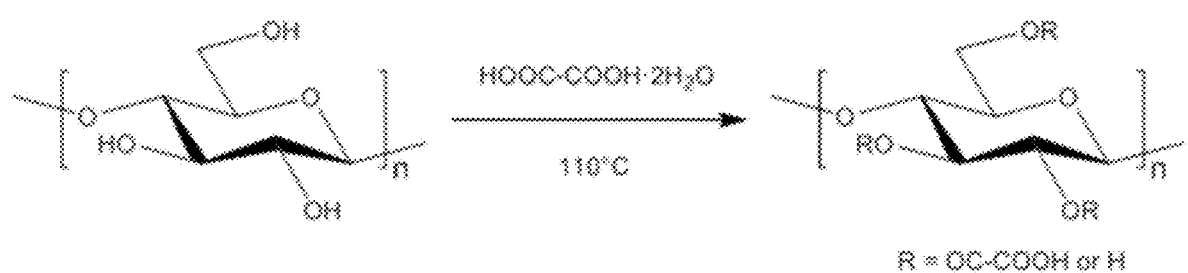
FIG. 1 shows a scheme of esterification of cellulose by oxalic acid dihydrate, as well as the most possible end product.
Figure 1:
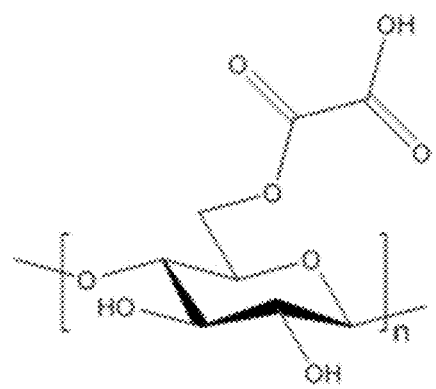
Figure 2:
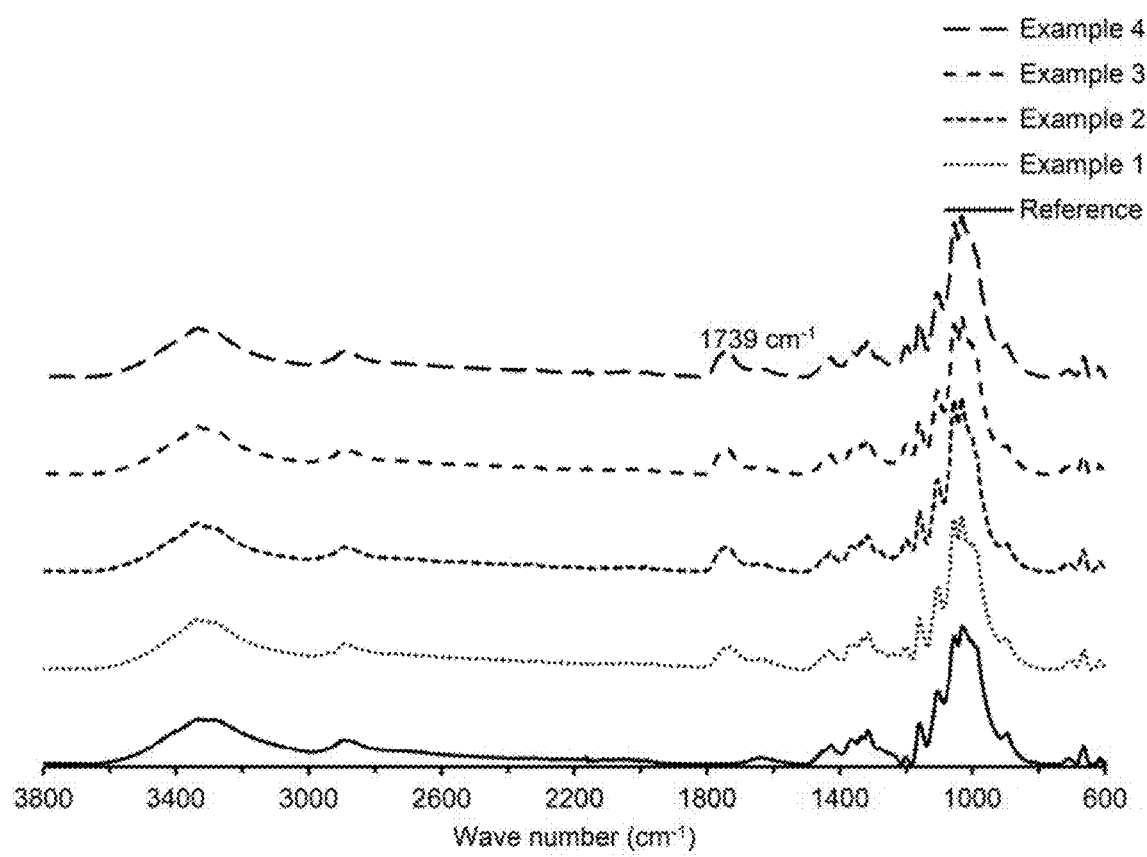
FIG. 2 shows FTIR (Fourier transform infrared spectroscopy) spectra of softwood dissolving pulp (reference) and cellulose oxalates in examples 1 to 4.
Figure 3:
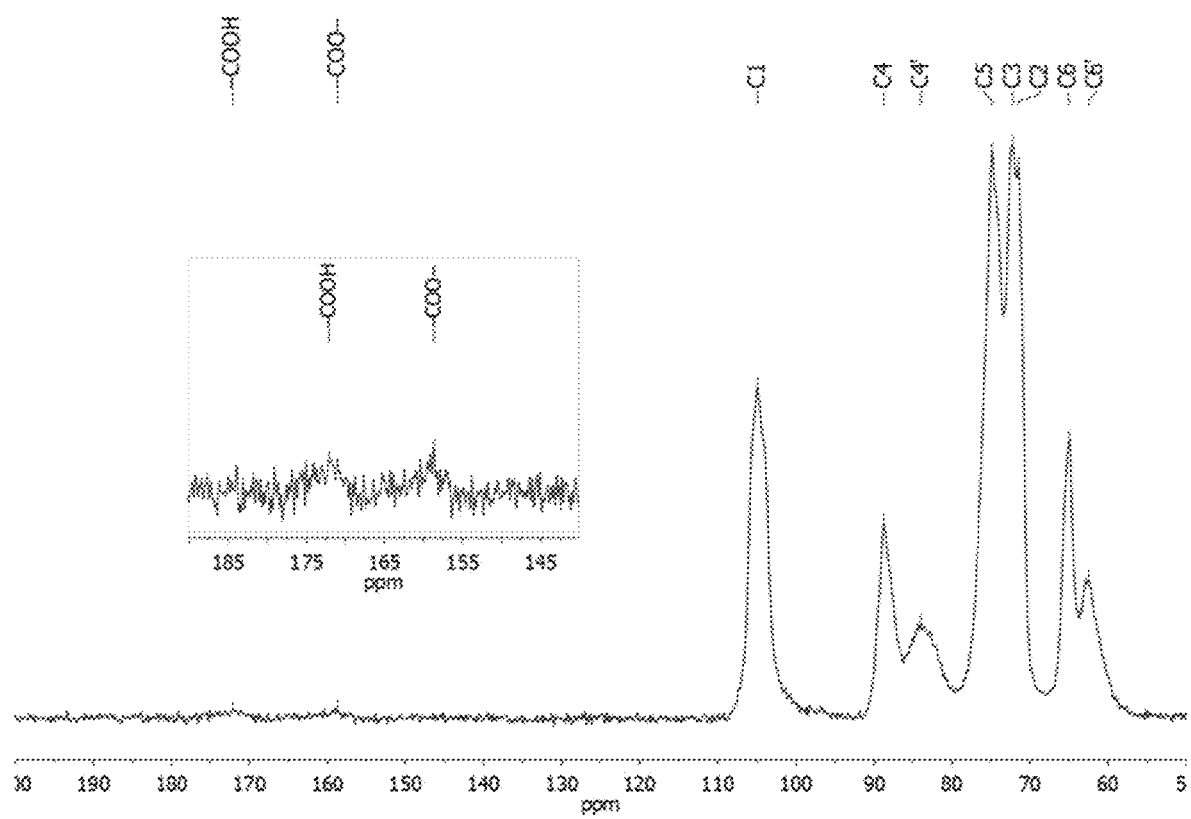
FIG. 3 shows CP/MAS $^{13}$C NMR (solid-state cross-polarization magic angle spinning carbon-13 NMR) spectrum of an example of cellulose oxalate.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

Nanocrystalline cellulose (NCC) as used throughout the description and the claims denotes cellulose in crystalline form or at least in essentially or mostly crystalline form, since less-ordered forms also exist in most NCCs. NCCs are rigid rod-like crystals with diameter in the range of 5-40 nm and lengths of typically a few hundred nanometers, in the range of 100-600 nm. (Osong S. H., Norgren S. and Engstrand P. 2016. Processing of wood-based microfibrillated cellulose and nanofibrillated cellulose, and applications relating to papermaking: a review. Cellulose 23: 93-123)

Nanofibrillated cellulose (NFC) or microfibrillated cellulose (MFC) as used throughout the description and the claims denotes cellulose containing both crystalline and less-ordered forms. NFCs or MFCs have diameters in the range of 5-100 nm and lengths of >600 nm to several μm. (Osong S. H., Norgren S. and Engstrand P. 2015. Processing of wood-based microfibrillated cellulose and nanofibrillated cellulose, and applications relating to papermaking: a review. Cellulose 23: 93-123; Nelson K., Retsina T., Iakovlev M., van Heiningen A., Deng Y., Shatkin J. A. and Mulyadi. 2016. Chapter 9. American Process: production of low cost nanocellulose for renewable, advanced materials applications. In *Materials Research for Manufacturing*. Eds. Madsen L. D. and Svedberg E. B. Springer International Publishing, Switzerland. pp. 267-302)

Cellulose-containing material is material comprising cellulose. Examples include but are not limited to wood pulp, non-wood pulp, cotton, and bacterial cellulose. It encompasses wood pulps as well as commercial microcrystalline cellulose produced from cotton linter.

Oxalic acid dihydrate (OAD) has a relatively low melting point of 104-106° C., which makes it possible to mix the molten OAD with pulp (cellulose-containing material) to carry out the esterification of cellulose.

A nanocellulose intermediate is a precursor of nanocellulose. A nanocrystalline cellulose intermediate is a precursor of nanocrystalline cellulose. A nanofibrillated cellulose intermediate is a precursor of nanofibrillated cellulose. The nanocellulose, nanocrystalline cellulose and nanofibrillated cellulose intermediates are produced in step c), i.e. when washing the mixture resulting from step b).

In a first aspect there is provided a method for manufacturing nanocellulose, said method comprising the steps of:
a) providing a cellulose-containing material wherein the cellulose-containing material contains less than 20 wt. % water, preferably less than 10 wt. % water,
b) contacting the cellulose-containing material with oxalic acid dihydrate, and heating above the melting point of the oxalic acid dihydrate, to obtain cellulose oxalates,
c) washing the mixture resulting from step b),
d) preparing a suspension comprising the washed material from step c), and
e) recovering nanocrystalline cellulose from the suspension,
wherein said nanocellulose is nanocrystalline cellulose.

In one embodiment the dry weight ratio between cellulose-containing material and oxalic acid dihydrate is 1:1 to 1:100, preferably 1:1 to 1:50, more preferably 1:1 to 1:10, most preferably 1:2.3 to 1:3.9.

In one embodiment oxalic acid dihydrate has a purity of 95-100 wt. %, preferably ≥99 wt. %.

In one embodiment the reaction in step b) is solvent-free.

In one embodiment the cellulose-containing material provided in step a) comprises at least 80 wt. % cellulose, preferably at least 90 wt. %. In one embodiment the cellulose-containing material provided in step a) is bleached.

In one embodiment the cellulose-containing material and the oxalic acid dihydrate are heated above 106° C., preferably above 110° C. in step b). In one embodiment the cellulose-containing material and the oxalic acid dihydrate are heated to a temperature in the interval 104-106° C. (approximate melting point of oxalic acid dihydrate), in other embodiments other intervals for the temperature are used including 105-107° C., 104-108° C., 105-110° C., 105-111° C., 104-111° C., and 104-112° C. In one embodiment the temperature in step b) does not exceed 120° C. The temperature should not be too high, otherwise the material will become dark during the reaction with oxalic acid dihydrate. The material becomes less useful when it becomes dark. Darkening can both occur at too high temperatures, typically above 120° C. and during extended treatment times, typically in excess of 120 minutes.

In one embodiment the cellulose-containing material and the oxalic acid dihydrate are mixed during step b). In one embodiment step b) is carried out in an extruder, a thermostatic reaction vessel, or a sealed pressure vessel.

In one embodiment the cellulose-containing material and the oxalic acid dihydrate are heated above the melting point of the oxalic acid dihydrate for a time in the interval 5-120 minutes, preferably 30-60 minutes.

In one embodiment the mixture is washed in step c) with at least one selected from the group consisting of ethanol, acetone, water, and THF. In an alternative embodiment the mixture is washed in step c) with at least one selected from the group consisting of water, ethanol, acetone, THF, and ethyl acetate. In yet another embodiment the mixture is washed in step c) with at least one solvent which is capable of dissolving oxalic acid dihydrate.

In one embodiment the washed material from step c) is mixed with water to obtain a suspension. As desired the pH and ionic strength of the suspension can be adjusted.

In one embodiment the suspension is prepared at a pH in the interval 9-10 in step d).

In one embodiment the suspension is prepared using at least one selected from the group consisting of sonication, micro-fluidization, and mechanical disintegration. It has been found that the use of sonication and micro-fluidization increase the yield of the process.

In one embodiment nanocrystalline cellulose in step e) is recovered from the suspension after centrifugation. The suspension is centrifuged and the nanocrystalline cellulose will remain in suspension whereas other parts will sediment.

In a second aspect of the invention a composition comprising nanocrystalline cellulose is manufactured according to the method disclosed in the first aspect and embodiments thereof.

In one embodiment the composition comprising nanocrystalline cellulose comprises nanocrystalline cellulose having free carboxyl groups.

In one embodiment the composition comprising nanocrystalline cellulose comprises free carboxyl groups with a density in the range 0.2-1.3 mmol/g, preferably 0.4-1.3 mmol/g. It is an advantage of the process that a high density of carboxyl groups can be obtained. Also carboxyl group-density in the ranges 0.5-1.3, 0.6-1.3, 0-7-1.3, 0.8-1.3, 0.9-1.3, 1.0-1.3, or 1.1-1.3 mmol/g are envisaged. In one embodiment the carboxyl groups are part of oxalate residues.

In one embodiment the composition comprising nanocrystalline cellulose further comprises nanofibrillated cellulose.

In one embodiment the composition comprising nanocrystalline cellulose further comprises nanofibrillated cellulose having free carboxyl groups.

In one embodiment the composition comprising nanocrystalline cellulose further comprises nanofibrillated cellulose having free carboxyl groups with a density in the range 0.2-1.3 mmol/g, preferably 0.4-1.3 mmol/g. It is an advantage of the process that a high density of carboxyl groups can be obtained. Also carboxyl group-density in the ranges 0.5-1.3, 0.6-1.3, 0-7-1.3, 0.8-1.3, 0.9-1.3, 1.0-1.3, or 1.1-1.3 mmol/g are envisaged. In one embodiment the carboxyl groups are part of oxalate residues.

In a third aspect of the invention the composition comprising nanocrystalline cellulose of the second aspect of the invention is used in at least one: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a fourth aspect there is provided a method for manufacturing nanocellulose, said method comprising the steps of:
  a) providing a cellulose-containing material wherein the cellulose-containing material contains less than 20 wt. % water, preferably less than 10 wt. % water,
  b) contacting the cellulose-containing material with oxalic acid dihydrate, and heating above the melting point of the oxalic acid dihydrate, to obtain cellulose oxalates, wherein the dry weight ratio between cellulose-containing material and oxalic acid dihydrate is 1:1 to 1:100, preferably 1:1 to 1:50, more preferably 1:1 to 1:10, most preferably 1:2.3 to 1.3.9,
  c) washing the mixture resulting from step b),
  d) preparing a suspension comprising the washed material from step c), wherein the suspension is prepared using micro-fluidization, and
  e) recovering nanocellulose from the suspension,
wherein said nanocellulose is nanofibrillated cellulose.

In one embodiment the cellulose-containing material provided in step a) comprises at least 80 wt. % cellulose, preferably at least 90 wt. %.

In one embodiment the cellulose-containing material provided in step a) is bleached.

In one embodiment oxalic acid dihydrate has a purity of 95-100 wt. %, preferably ≥99 wt. %.

In one embodiment the reaction in step b) is solvent-free.

In one embodiment oxalic acid dihydrate has a purity of 95-100 wt. %, preferably ≥99 wt. %.

In one embodiment the cellulose-containing material and the oxalic acid dihydrate are heated above 106° C., in step b).

In one embodiment the cellulose-containing material and the oxalic acid dihydrate are heated above 110° C., in step b).

In one embodiment the temperature in step b) does not exceed 120° C.

In one embodiment the cellulose-containing material and the oxalic acid dihydrate are mixed during step b).

In one embodiment step b) is carried out in an extruder, or a thermostatic reaction vessel, or a sealed pressure vessel.

In one embodiment the cellulose-containing material and the oxalic acid dihydrate are heated above the melting point of the oxalic acid dihydrate for a time in the interval 5-120 minutes, preferably 30-60 minutes.

In one embodiment the mixture is washed in step c) with at least one solvent capable of dissolving oxalic acid dihydrate.

In one embodiment the mixture is washed in step c) with at least one selected from the group consisting of ethanol, acetone, water, and THF.

In one embodiment washed material from step c) is mixed with water to obtain a suspension.

In one embodiment the suspension is prepared at a pH in the interval 9-10 in step d).

In one embodiment nanofibrillated cellulose in step e) is recovered from the suspension after centrifugation.

In one embodiment cellulose-containing material is not contacted with a deep eutectic solvent(s).

In a fifth aspect of the invention a composition comprising nanofibrillated cellulose is manufactured according to the method disclosed in the fourth aspect and embodiments thereof.

In one embodiment the composition comprising nanofibrillated cellulose comprises nanofibrillated cellulose having free carboxyl groups.

In one embodiment the composition comprising nanofibrillated cellulose comprises nanofibrillated cellulose having free carboxyl groups with a density in the range 0.2-1.3 mmol/g, preferably 0.4-1.3 mmol/g. It is an advantage of the process that a high density of carboxyl groups can be obtained. Also carboxyl group-density in the ranges 0.5-1.3, 0.6-1.3, 0-7-1.3, 0.8-1.3, 0.9-1.3, 1.0-1.3, or 1.1-1.3 mmol/g are envisaged. In one embodiment the free carboxyl groups are part of oxalate residues.

In a sixth aspect of the invention the composition comprising nanofibrillated cellulose according to fifth aspect of the invention is used at least in one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a seventh aspect there is provided a method for manufacturing nanocellulose intermediate, said method comprising the steps of:
 a. providing a cellulose-containing material wherein the cellulose-containing material contains less than 20 wt. % water, preferably less than 10 wt. % water,
 b. contacting the cellulose-containing material with oxalic acid dihydrate, and heating above the melting point of the oxalic acid dihydrate, to obtain cellulose oxalates,
 c. washing the mixture resulting from step b),
 wherein said nanocellulose intermediate is a nanocrystalline cellulose intermediate.

In one embodiment the cellulose-containing material provided in step a) comprises at least 80 wt. % cellulose, preferably at least 90 wt. %.

In one embodiment the cellulose-containing material provided in step a) is bleached.

In one embodiment the dry weight ratio between cellulose-containing material and oxalic acid dihydrate is 1:1 to 1:100, preferably 1:1 to 1:50, more preferably 1:1 to 1:10, most preferably 1:2.3 to 1:3.9.

In one embodiment oxalic acid dihydrate has a purity of 95-100 wt. %, preferably ≥99 wt. %.

In one embodiment the reaction in step b) is solvent-free.

In one embodiment the cellulose-containing material and the oxalic acid dihydrate are heated above 106° C., in step b).

In one embodiment the cellulose-containing material and the oxalic acid dihydrate are heated above 110° C., in step b).

In one embodiment the temperature in step b) does not exceed 120° C.

In one embodiment the cellulose-containing material and the oxalic acid dihydrate are mixed during step b).

In one embodiment step b) is carried out in an extruder, or a thermostatic reaction vessel, or a sealed pressure vessel.

In one embodiment the cellulose-containing material and the oxalic acid dihydrate are heated above the melting point of the oxalic acid dihydrate for a time in the interval 5-120 minutes, preferably 30-60 minutes.

In one embodiment the mixture is washed in step c) with at least one solvent capable of dissolving oxalic acid dihydrate.

In one embodiment the mixture is washed in step c) with at least one selected from the group consisting of ethanol, acetone, water, and THF.

In an eighth aspect of the invention there is provided a composition comprising nanocrystalline cellulose intermediate manufactured according to the eighth aspect of the invention.

In one embodiment the composition comprising nanocrystalline cellulose intermediate comprises nanocrystalline cellulose intermediate having free carboxyl groups.

In one embodiment the composition comprising nanocrystalline cellulose intermediate comprises nanocrystalline cellulose intermediate having free carboxyl groups with a density in the range 0.2-1.3 mmol/g, preferably 0.4-1.3 mmol/g. Also carboxyl group-density in the ranges 0.5-1.3, 0.6-1.3, 0-7-1.3, 0.8-1.3, 0.9-1.3, 1.0-1.3, or 1.1-1.3 mmol/g are envisaged. In one embodiment the free carboxyl groups are part of oxalate residues.

In one embodiment the composition comprising nanocrystalline cellulose intermediate further comprises nanofibrillated cellulose intermediate.

In one embodiment the composition comprising nanocrystalline cellulose intermediate comprises nanofibrillated cellulose intermediate having free carboxyl groups.

In one embodiment the composition comprising nanocrystalline cellulose intermediate comprises nanofibrillated cellulose intermediate having free carboxyl groups with a density in the range 0.2-1.3 mmol/g, preferably 0.4-1.3 mmol/g. Also carboxyl group-density in the ranges 0.5-1.3, 0.6-1.3, 0-7-1.3, 0.8-1.3, 0.9-1.3, 1.0-1.3, or 1.1-1.3 mmol/g are envisaged. In one embodiment the free carboxyl groups are part of oxalate residues.

In a ninth aspect of the invention the composition comprising nanocrystalline cellulose intermediate according to the eight aspect of the invention is used at least in one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a tenth aspect of the invention there is provided a method for manufacturing nanocellulose intermediate, said method comprising the steps of:
a. providing a cellulose-containing material wherein the cellulose-containing material contains less than 20 wt. % water, preferably less than 10 wt. % water,
b. contacting the cellulose-containing material with oxalic acid dihydrate, and heating above the melting point of the oxalic acid dihydrate, to obtain cellulose oxalates, wherein the dry weight ratio between cellulose-containing material and oxalic acid dihydrate is 1:1 to 1:100, preferably 1:1 to 1:50, more preferably 1:1 to 1:10, most preferably 1:2.3 to 1.3.9,
c. washing the mixture resulting from step b),
wherein said nanocellulose intermediate is nanofibrillated cellulose intermediate.

In one embodiment the cellulose-containing material provided in step a) comprises at least 80 wt. % cellulose, preferably at least 90 wt. %.

In one embodiment the cellulose-containing material provided in step a) is bleached.

In one embodiment oxalic acid dihydrate has a purity of 95-100 wt. %, preferably ≥99 wt. %.

In one embodiment the reaction in step b) is solvent-free.

In one embodiment the cellulose-containing material and the oxalic acid dihydrate are heated above 106° C., in step b).

In one embodiment the cellulose-containing material and the oxalic acid dihydrate are heated above 110° C., in step b).

In one embodiment the temperature in step b) does not exceed 120° C.

In one embodiment the cellulose-containing material and the oxalic acid dihydrate are mixed during step b).

In one embodiment step b) is carried out in an extruder, or a thermostatic reaction vessel, or a sealed pressure vessel.

In one embodiment the cellulose-containing material and the oxalic acid dihydrate are heated above the melting point of the oxalic acid dihydrate for a time in the interval 5-120 minutes, preferably 30-60 minutes.

In one embodiment the mixture is washed in step c) with at least one solvent capable of dissolving oxalic acid dihydrate.

In one embodiment the mixture is washed in step c) with at least one selected from the group consisting of ethanol, acetone, water, and THF.

In one embodiment washed material from step c) is mixed with water to obtain a suspension.

In one embodiment cellulose-containing material is not contacted with a deep eutectic solvent(s).

In an eleventh aspect of the invention there is provided a composition comprising nanofibrillated cellulose intermediate manufactured according to the tenth aspect of the invention.

In one embodiment the composition comprising nanofibrillated cellulose intermediate comprises nanofibrillated cellulose intermediate having free carboxyl groups.

In one embodiment the composition comprising nanofibrillated cellulose intermediate comprises nanofibrillated cellulose intermediate having free carboxyl groups with a density in the range 0.2-1.3 mmol/g, preferably 0.4-1.3 mmol/g. Also carboxyl group-density in the ranges 0.5-1.3, 0.6-1.3, 0-7-1.3, 0.8-1.3, 0.9-1.3, 1.0-1.3, or 1.1-1.3 mmol/g are envisaged. In one embodiment the free carboxyl groups are part of oxalate residues.

In a twelfth aspect of the invention there is provided a composition comprising nanofibrillated cellulose intermediate used in least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

Recovering nanocellulose in step e) in the above disclosed aspects and embodiments is done by preparing a suspension of nanocellulose, a mixture containing nanocellulose or a dry material containing nanocellulose. Thus, recovering nanocrystalline cellulose and/or nanofibrillated cellulose in step e) is done by preparing a suspension of nanocrystalline cellulose and/or nanofibrillated cellulose, a mixture containing nanocrystalline cellulose and/or nanofibrillated cellulose, or a dry material containing nanocrystalline cellulose and/or nanofibrillated cellulose.

All the described alternative embodiments above or parts of an embodiment can be freely combined without departing from the inventive idea as long as the combination is not contradictory.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

EXPERIMENTAL

All percentages and ratios are calculated by weight unless clearly indicated otherwise.

Materials. Commercially available softwood dissolving pulp (cellulose content 96%), hardwood dissolving pulp (cellulose content 97%), microcrystalline cellulose (Avicel PH-101, cellulose content 100%), and bleached softwood kraft pulp (cellulose content>80%) were used as cellulose raw material. Each dried pulp was manually torn to smaller pieces (around 2×2 cm$^2$). Oxalic acid dihydrate (≥99%), tetrahydrofuran (THF, ≥99.99%), acetone (≥99%), and ethanol (≥95%) were commercially available. Deionized water was used to prepare all suspensions of the resulting nanocrystalline celluloses.

Esterification of cellulose by oxalic acid dihydrate. Each pulp was mixed with oxalic acid dihydrate according to the dry weight ratios of 1/2.3 or 1/3.9. Each mixture was heated at 110° C. for 30 min, 35 min, or 60 min under constant mixing, to obtain cellulose oxalates (see all examples in Tables 1 and 2). After the reaction, each mixture was washed by THF, ethanol, or acetone to remove the excess oxalic acid dihydrate and then Soxhlet extracted by THF or ethanol for 20 h, or washed excessively by filtration of ethanol or acetone until the conductivity of filtrate was below 2 μS cm$^{-1}$. Then all samples were dried either in fume hood or at 50° C. in an oven.

Preparation of nanocrystalline cellulose suspension. Aqueous suspensions of cellulose oxalates with pH 9-10 were prepared. Each suspension was sonicated with 40% amplitude and centrifuged. The supernatant was collected to obtain a suspension of nanocrystalline cellulose.

Some of the aqueous suspensions of cellulose oxalates with pH 9-10 were homogenized in a micro-fluidizer with 1 pass at 925 bar through a 400 μm and a 200 μm chamber, and then with 1 to 5 passes at 1600 bar through a 200 μm and a 100 μm chamber, to obtain gel-like suspensions of nanocrystalline cellulose with a consistency of 1.5 wt. %. Some of such suspensions were diluted 6 times and centrifuged. The supernatant was collected and dried at 105° C. in an oven, to calculate the yield of nanocrystalline cellulose that was stably dispersed in water.

According to our tests, using micro-fluidization can convert nearly 100% of the nanocellulose intermediate to nanocellulose if water is used as the liquid media. Moreover, our tests, no matter what types of media are used (i.e. water, organic solvent(s), a mixture of both water and organic solvent(s), oil(s), emulsion(s), paint(s), adhesive(s) etc.), the suspensions after micro-fluidization (or any manners of high-shear disintegration) always contain nanocellulose.

Results

The total carboxyl content (TCC) of cellulose oxalates in examples 1 to 4, as determined by alkaline hydrolysis and back titration (Peydecastaing J., Vaca-Garcia C. and Borredon E. 2009. Accurate determination of the degree of substitution of long chain cellulose esters. Cellulose 16: 289-297.), showed the amounts of carboxyl groups from both carboxylic acids (—COOH) and esters (—COO—) of the cellulose oxalates. The values of TCC showed the same trend as that of the degree of substitution (DS), where the highest DS of 0.30 and TCC of 1.63 mmol/g were given by the cellulose oxalate in example 3 (Table 3). For comparison, the conductometric titration method was applied. This method only determines the free carboxyl content (FCC). The free carboxyl groups were in the forms of acids. The highest FCC of 1.30 mmol/g was given by the cellulose oxalates in examples 3 and 4.

The appearance of cellulose changed significantly due to the esterification. The original pulp sheet pieces turned into very fine powders, which indicated the breakdown of the macromolecular structure arising from, probably, the acid hydrolysis. To verify the assumption, the molecular weight (Mw) properties of cellulose oxalates were determined by size exclusion chromatography.

The treatment of cellulose with oxalic acid dihydrate caused a substantial decrease of Mw, as shown by Table 1. The Mws of the cellulose oxalates in examples 1 to 4 were around 40 kDa, which were only one tenth of the Mw of the corresponding raw material (softwood dissolving pulp). Cellulose underwent a quick and severe acid hydrolysis during the esterification might be the reason.

Some pulps became dark brown or black after the reaction. The rests remained white or became slightly grey, and the gravimetric yields of these samples were 82-99% (Tables 1 and 2). Therefore, only these samples were analyzed and used to prepare aqueous suspensions for the following sonication or micro-fluidization.

Free carboxyl groups were introduced on cellulose through the esterification, and their contents were 0.2-1.3 mmol/g (Tables 1 and 2). The values of anionic charge density are higher than that of the sulfuric acid-treated cellulose, which was 0.17 mmol/g (Ureña-benavides E. E., Ao G., Davis V. A., Kitchens, C. L. 2011. Rheology and phase behavior of lyotropic cellulose nanocrystal suspensions. Macromolecules 44:8990-8998.).

Amongst other chemical derivatization routes the free carboxylic acid functional groups can be used for further derivatization, such as preparing acyl chlorides by reacting with thionyl chloride $SOCl_2$, preparing acid anhydrides by reacting with carboxylic acids, preparing esters by reacting with alcohols, preparing thioesters by reacting with thiols, preparing amides by reacting with amines, and preparing alcohols by reduction. The cellulose-oxalate esters can be hydrolyzed to produce uncharged cellulose again. At alkaline conditions, the carboxylic acid groups can be converted to carboxylate groups, which can adsorb cationic quaternary ammonium salts having alkyl, phenyl, glycidyl, and diallyl groups through electrostatic attraction, to prepare hydrophobic nanocellulose (Salajkova M, Berglund L A, Zhou Q. 2012 Hydrophobic cellulose nanocrystals modified with quaternary ammonium salts. J. Mater. Chem. 22:19798-19805.).

It is noteworthy that the cellulose oxalates washed and Soxhlet extracted by ethanol had lower FCCs than the ones washed by THF, probably due to the esterification or alcoholysis that happened between ethanol and the free carboxyl groups.

The onset temperature of thermal degradation of the cellulose oxalates were 173-177° C. (Table 2), which can be correlated to the modified and less-ordered surfaces of cellulose. Considering the onset temperatures, the cellulose oxalates and probably the resulting nanocellulose can be used as reinforcing fillers for thermoplastics, such as polystyrene (PS, melting temperature 74-105° C.), acrylonitrile-butadine-styrene copolymers (ABS, melting temperature 88-125° C.), low density polyethylene (LDPE, melting temperature 103-110° C.), linear low density polyethylene (LLDPE, melting temperature 110-125° C.), high density polyethylene (HDPE melting temperature 125-132° C.), polycarbonate (PC, melting temperature 145° C.), and polypropylene (PP, melting temperature 150-175° C.) (Dolinar B. 2005. Improved variegated composites and related methods of manufacture. WO 2005123364 A1.).

The solvent used to wash the cellulose oxalates could be evaporated to recover the excess oxalic acid dihydrate, which could be then recrystallized in ethyl acetate to obtain pure oxalic acid dihydrate.

Preparation and Characterization of Nanocellulose.

The samples that were homogenized formed a thick gel at a consistency of 1.5 wt. %. The samples that were prepared through sonication had a less viscous appearance.

The supernatants collected after centrifugation were somewhat turbid or transparent.

Figure 4A:
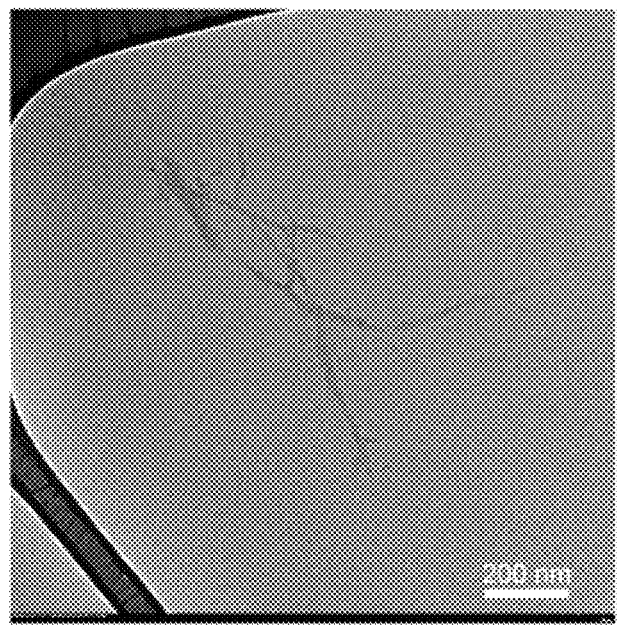
FIGS. 4a and b are TEM (transmission electron microscopy) images of nanocrystalline cellulose prepared from the cellulose oxalate in example 3.
Figure 4B:
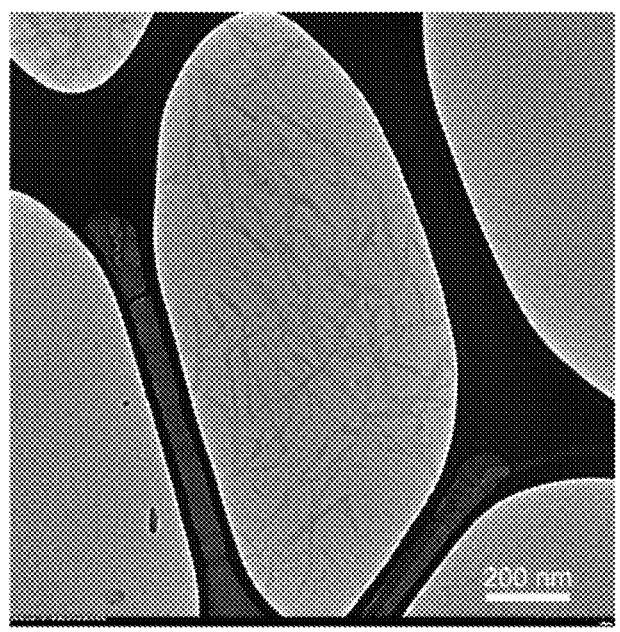
Figure 5:
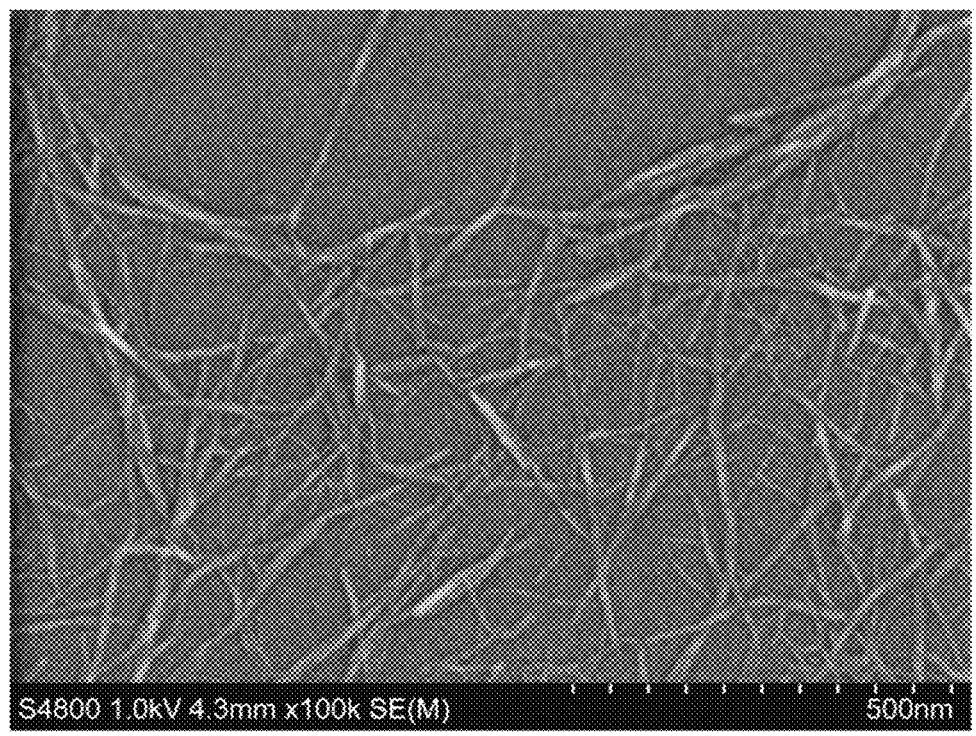
FIG. 5 is a FE-SEM (field-emission scanning electron microscopy) image of nanocellulose containing both nanocrystalline and nanofibrillated cellulose prepared from the cellulose oxalate in example 18.
Figure 6:
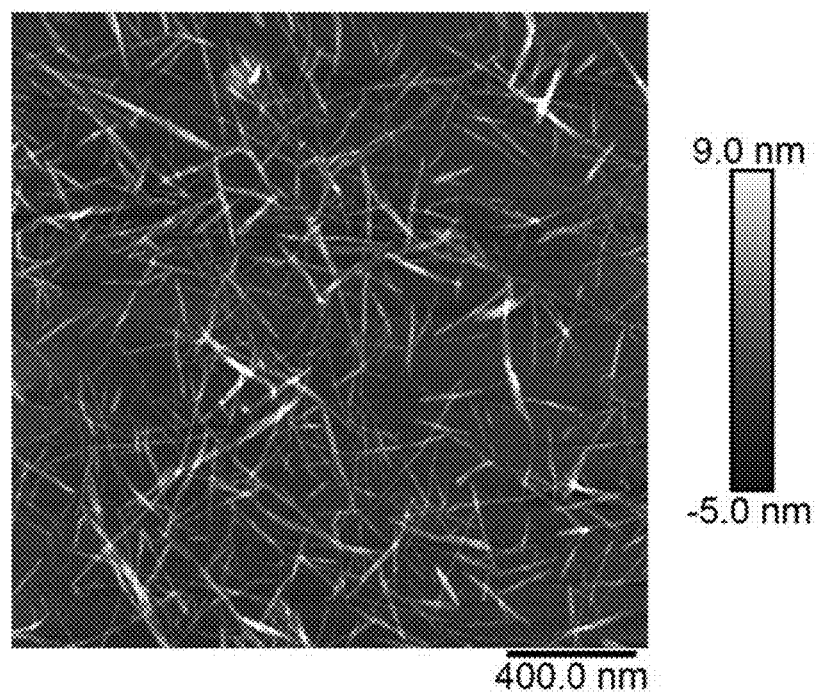
FIG. 6 is an AFM (atomic force microscopy) image of nanocellulose containing both nanocrystalline and nanofibrillated cellulose prepared from the cellulose oxalate in example 18.

Transmission electron microscopy images shown in FIGS. 4*a* and *b* confirmed the presence of nanocrystalline cellulose in the prepared suspension. The shape of nanostructured cellulose appeared to be individual rods with widths in the range of 16-20 nm and lengths in the range of 150-220 nm. A field-emission scanning electron microscopy image shown in FIG. 5, and an atomic force microscopy image shown in FIG. 6 confirmed the presence of nanocrystalline and nanofibrillated cellulose in the prepared suspension. The shape of nanostructured cellulose appeared to be individual rods as well as short fibrils, with width in the range of 15-36 nm and lengths in the range of 260-900 nm. When the concentrated suspension was observed between the crossed polarizers, birefringence patterns were shown. Moreover, it was possible to prepare transparent films through solvent-casting of the nanocellulose suspension. The films exhibited iridescent color while tilted under light. By X-ray diffraction, the crystallinity indexes of the films in all examples were 68%-80%, which confirmed that the prepared nanocelluloses were mostly crystalline (Table 1). It was also possible to prepare transparent films by membrane filtration followed by suspended drying at 93° C. under vacuum. The films exhibited good tensile properties. Films made from example 20 had a tensile strength of 136.6±8.7 MPa, an elongation at break of 3.0±0.6%, and an elastic modulus of 10.6±0.6 GPa. Films made from example 22 had a tensile strength of 195.3±9.9 MPa, an elongation at break of 5.0±0.9%, and an elastic modulus of 10.2±0.5 GPa. By X-ray diffraction, the crystallinity indexes of the films made from examples 20 and 22 were 76% and 67%, respectively (Table 2).

By dynamic light scattering, the z-average sizes of the nanoparticles in all examples were 109-535 nm with narrow distributions. The gravimetric yields of nanocrystalline celluloses were 42-94%, as calculated from the dry weight of raw materials (Tables 1 and 2).

The described method can be used to prepare pure nanocrystalline cellulose as evident by the size and crystallinity indexes of the materials (Tables 1 and 2). When preparing nanocellulose by using a micro-fluidizer the material consisted of a mixture of both nanocrystalline and nanofibrillated cellulose, as evident by the micrographs and the size of the particles. A longer aspect ratio was also indicated by the gelation tendencies. It is possible to prepare pure nanofibrillated cellulose by preparing the material in a reactor where the reaction time, pulp particle size and mixing has been optimized to give milder and more homogeneous conditions.

TABLE 1

Summary of examples of esterification of cellulose by oxalic acid dihydrate, preparation of nanocrystalline cellulose (NCC) by sonication, and characterizations of cellulose oxalates and the resulting NCC.

| | | Esterification | | | | Sonication | Free carboxyl | Characterization | | | |
| --- | --- | --- | --- | --- | --- | --- | --- | --- | --- | --- | --- |
| Example | Type of raw material | Weight ratio of pulp/ oxalic acid dihydrate | Reaction time (min) | Washing[b] agent after reaction | Gravimetric yield (%) after estetrification | Total gravimetric yield (%) (mmol/g) of NCC after sonication and centrifuge | content[c] of cellulose oxalate | Molecular weight (kDa) of cellulose oxalate | Crystallinity index (%) of NCC | z-average (nm) of NCC | Polydispersity index of NCC |
| 1 | Softwood dissolving pulp | 1/3.9 | 15 | THF | NA[a] | NA[a] | 1.22 | 38 | NA[a] | NA[a] | NA[a] |
| 2 | Softwood dissolving pulp | 1/3.9 | 30 | THF | 99 | 58 | 1.26 | 44 | 68.2 | 170 | 0.41 |
| 3 | Softwood dissolving pulp | 1/3.9 | 60 | THF | 94 | 81 | 1.30 | 44 | 75.5 | 169 | 0.57 |
| 4 | Softwood dissolving pulp | 1/3.9 | 120 | THF | NA[a] | NA[a] | 1.30 | 41 | NA[a] | NA[a] | NA[a] |
| 5 | Softwood dissolving pulp | 1/3.9 | 30 | Ethanol | 93 | 55 | 0.39 | NA[a] | 69.6 | 182 | 0.44 |
| 6 | Softwood dissolving pulp | 1/3.9 | 60 | Ethanol | 88 | 62 | 0.29 | NA[a] | 75.3 | 180 | 0.48 |
| 7 | Ground (20 mesh) softwood | 1/2.3 | 30 | Ethanol | 89 | 55 | 0.30 | NA[a] | 80.3 | 395 | 0.52 |

TABLE 1-continued

Summary of examples of esterification of cellulose by oxalic acid dihydrate, preparation of nanocrystalline cellulose (NCC) by sonication, and characterizations of cellulose oxalates and the resulting NCC.

|  |  | Esterification | | | | Sonication | Characterization | | | | |
|---|---|---|---|---|---|---|---|---|---|---|---|
| Example | Type of raw material | Weight ratio of pulp/ oxalic acid dihydrate | Reaction time (min) | Washing[b] agent after reaction | Gravimetric yield (%) after estetrification | Total gravimetric (mmol/g) of NCC after sonication and centrifuge | Free carboxyl yield (%) content[c] of cellulose oxalate | Molecular weight (kDa) of cellulose oxalate | Crystallinity index (%) of NCC | z-average (nm) of NCC | Poly-dispersity index of NCC |
| 8 | dissolving pulp Ground (20 mesh) softwood dissolving pulp | 1/2.3 | 60 | Ethanol | 82 | 64 | 0.31 | NA[a] | 79 | 331 | 0.51 |
| 9 | Softwood dissolving pulp | 1/2.3 | 30 | Ethanol | 97 | 42 | 0.15 | NA[a] | 74.4 | 517 | 0.49 |
| 10 | Softwood dissolving pulp | 1/2.3 | 60 | Ethanol | 94 | 56 | 0.18 | NA[a] | 75.5 | 535 | 0.52 |
| 11 | Hardwood dissolving pulp | 1/2.3 | 30 | Ethanol | 92 | 51 | 0.18 | NA[a] | 73.4 | 394 | 0.51 |
| 12 | Hardwood dissolving pulp | 1/2.3 | 60 | Ethanol | 84 | 63 | 0.18 | NA[a] | 73.3 | 260 | 0.55 |
| 13 | Avicel PH-101 (microcrystalline cellulose) | 1/2.3 | 30 | Ethanol | 93 | 55 | 0.18 | NA[a] | 78.8 | 452 | 0.47 |
| 14 | Avicel PH-101 (microcrystalline cellulose) | 1/2.3 | 60 | Ethanol | 89 | 57 | 0.22 | NA[a] | 79.8 | 359 | 0.50 |
| 15 | Freeze-dried bleached softwood kraft pulp | 1/2.3 | 30 | Ethanol | 91 | 51 | 0.10 | NA[a] | 72.4 | 391 | 0.79 |

[a]NA: not available.
[b]Washing by Soxhlet extraction.
[c]Determined by conductometric titration.

TABLE 2

Summary of examples of esterification of cellulose by oxalic acid dihydrate, preparation of nanocellulose (NC) by micro-fluidization, and characterizations of cellulose oxalates and the resulting NC.

|  |  | Esterification | | | | Microfluidization | Characterization | | | | |
|---|---|---|---|---|---|---|---|---|---|---|---|
| Example | Type of raw material | Weight ratio of pulp/ oxalic acid dihydrate | Reaction time (min) | Washing[b] agent after reaction | Gravimetric yield (%) after esterification | Total gravimetric yield (%) of NC after microfluidization and centrifuge | Free carboxyl content[c] (mmol/g) of cellulose oxalate | Onset temperature of thermal degradation of cellulose oxalate (°C.) | Crystallinity index (%) of NC | z-average (nm) of NC | Poly-dispersity index of NC |
| 16 | Softwood dissolving pulp | 1/3.9 | 60 | Ethanol | 85 | NA[a] | 0.62 | 175 | NA[a] | NA[a] | NA[a] |
| 17 | Softwood kraft pulp | 1/3.9 | 60 | Ethanol | 86 | NA[a] | 0.97 | 176 | NA[a] | NA[a] | NA[a] |
| 18 | Softwood kraft pulp | 1/3.9 | 35 | Ethanol | 84 | NA[a] | 0.92 | 177 | NA[a] | NA[a] | NA[a] |
| 19 | Softwood dissolving pulp | 1/3.9 | 35 | Ethanol | 94 | NA[a] | 0.86 | 175 | NA[a] | NA[a] | NA[a] |
| 20 | Softwood dissolving pulp | 1/3.9 | 35 | Acetone | 97 | 90 | 1.05 | 176 | 76.4 | 183 | 0.49 |
| 21 | Softwood dissolving pulp | 1/3.9 | 60 | Acetone | 96 | NA[a] | 1.08 | 175 | NA[a] | NA[a] | NA[a] |
| 22 | Softwood kraft pulp | 1/3.9 | 35 | Acetone | 96 | 94 | 1.10 | 173 | 66.5 | 109 | 0.37 |

TABLE 2-continued

Summary of examples of esterification of cellulose by oxalic acid dihydrate, preparation of nanocellulose (NC) by micro-fluidization, and characterizations of cellulose oxalates and the resulting NC.

| | | Esterification | | | | Microfluidization | Characterization | | | | |
|---|---|---|---|---|---|---|---|---|---|---|---|
| Example | Type of raw material | Weight ratio of pulp/ oxalic acid dihydrate | Reaction time (min) | Washing[b] agent after reaction | Gravimetric yield (%) after esterification | Total gravimetric yield (%) of NC after microfluidization and centrifuge | Free carboxyl content[c] (mmol/g) of cellulose oxalate | Onset temperature of thermal degradation of cellulose oxalate (° C.) | Crystallinity index (%) of NC | z-average (nm) of NC | Polydispersity index of NC |
| 23 | Softwood kraft pulp | 1/3.9 | 60 | Acetone | 99 | NA[a] | 1.04 | NA[a] | NA[a] | NA[a] | NA[a] |

[a]NA: not available.
[b]Washing by filtration of ethanol or acetone until the conductivity of filtrate was below 2 μS cm$^{-1}$.
[c]Determined by conductometric titration.

TABLE 3

Degree of substitution and total carboxyl content of the cellulose oxalates in examples 1 to 4, as determined by alkaline hydrolysis and back titration.

| Example | Reaction time (min) | Degree of substitution | Total carboxyl content (mmol/g) of cellulose oxalate |
|---|---|---|---|
| 1 | 15 | 0.23 | 1.30 |
| 2 | 30 | 0.29 | 1.57 |
| 3 | 60 | 0.30 | 1.63 |
| 4 | 120 | 0.28 | 1.53 |

The invention claimed is:

1. A method for manufacturing nanocellulose intermediate, said method comprising the steps of:
   a. providing a cellulose-containing material wherein the cellulose-containing material contains less than 20 wt. % water,
   b. contacting the cellulose-containing material with oxalic acid dihydrate, wherein the dry weight ratio between cellulose-containing material and oxalic acid dihydrate is 1:1 to 1:100, and heating above the melting point of the oxalic acid dihydrate, to obtain cellulose oxalates,
   c. washing the mixture resulting from step b),
   d. isolating and collecting the nanocellulose intermediate, wherein said nanocellulose intermediate is a nanocrystalline cellulose intermediate or a nanofibrillated cellulose intermediate or a mixture thereof.

2. The method according to claim 1, wherein the cellulose-containing material provided in step a) comprises at least 80 wt. % cellulose.

3. The method according to claim 1, wherein the cellulose-containing material and the oxalic acid dihydrate are heated above 106° C., in step b).

4. The method according to claim 1, wherein the mixture is washed in step c) with at least one solvent capable of dissolving oxalic acid dihydrate.

5. The method according to claim 1, wherein the cellulose-containing material provided in step a) contains less than 10 wt. % water.

6. The method according to claim 1, wherein the cellulose-containing material provided in step a) comprises at least 90 wt. % cellulose.

7. The method according to claim 1, wherein the dry weight ratio between cellulose-containing material and oxalic acid dihydrate is 1:1 to 1:50.

8. The method according to claim 1, wherein the dry weight ratio between cellulose-containing material and oxalic acid dihydrate is 1:1 to 1:10.

9. The method according to claim 1 wherein the dry weight ratio between cellulose-containing material and oxalic acid dihydrate is 1:2.3 to 1:3.9.

10. The method according to claim 1, wherein the cellulose-containing material and the oxalic acid dihydrate are heated above 110° C., in step b).

11. The method according to claim 1, wherein the temperature in step b) does not exceed 120° C.

12. The method according to claim 1, wherein the mixture is washed in step c) with at least one solvent selected from the group consisting of ethanol, acetone, water, and THF.

13. The method according to claim 10, wherein the temperature in step b) does not exceed 120° C.

* * * * *